United States Patent [19]

Kling

[11] 4,147,472

[45] Apr. 3, 1979

[54] TURBINE ROTOR

[76] Inventor: Alberto Kling, Seestr. 38, 8131 Berg, Fed. Rep. of Germany

[21] Appl. No.: 800,330

[22] Filed: May 25, 1977

[30] Foreign Application Priority Data

Apr. 7, 1977 [DE] Fed. Rep. of Germany ....... 2715729

[51] Int. Cl.² .............................................. F03D 1/06
[52] U.S. Cl. ................................. 416/193 R; 416/189
[58] Field of Search .................... 416/189, 193, 193 A

[56] References Cited

U.S. PATENT DOCUMENTS

| 883,891 | 4/1908 | Kieser | 416/189 |
| 3,193,185 | 7/1965 | Erwin et al. | 416/193 X |
| 3,519,367 | 7/1970 | Lariviere | 416/189 X |
| 3,695,780 | 10/1972 | Velkoff | 416/189 |

FOREIGN PATENT DOCUMENTS

| 455854 | 11/1928 | Fed. Rep. of Germany | 416/189 A |
| 894822 | 1/1945 | France | 416/193 |
| 213022 | 3/1924 | United Kingdom | 416/189 A |
| 227220 | 9/1969 | U.S.S.R. | 416/193 |

Primary Examiner—Everette A. Powell, Jr.
Attorney, Agent, or Firm—Stevens, Davis, Miller & Mosher

[57] ABSTRACT

A turbine rotor comprising radially extending blades having inner and outer ends and an axially symmetrical annular shroud having upstream and downstream ends affixed to the blades adjacent the outer ends thereof and rotating with the blades. The annular shroud increases in diameter from its upstream end to its downstream end such that a passage formed thereby widens from its upstream intake opening towards it downstream outlet opening, with the annular shroud in radial section having a profile adapted to produce a lift force under on-flow conditions and being oriented such that its suction side forms the interior surface of the annular shroud facing the passage and that its angle of attack relative to a direction extending parallel to the central axis of the annular passage is smaller than the critical (stalling) angle of the profile. A further annular shroud may be fixed to the inner ends of the blades.

7 Claims, 7 Drawing Figures

TURBINE ROTOR

This invention relates to a turbine rotor, particularly to a wind turbine rotor comprising a shroud affixed to the blades thereof adjacent the outer periphery of said rotor and formed as an axially symmetrical annular shroud rotating with the rotor.

For augmenting the flow volume intake of a wind turbine rotor of a given cross section for conversion thereof into another form of energy, such as electric energy, it is known to employ stationary diffusors, by means of which the energy output of the wind turbine may be increased by a factor of about 3, as compared to unshrouded turbines under equally free wind flow conditions. These stationary diffusors, which surround the rotor rotating therein in the manner of a channel duct, are employed for augmenting the wind energy intake of a wind turbine by increasing the volumetric flow rate at the turbine, i.e. by increasing the wind flow velocity as well as the pressure drop across the turbine. This, in turn, increases the amount of kinetic energy that can be extracted from the wind by a turbine of a given diameter.

Such stationary diffusor shrouds are therefore employed to decrease the size of a wind turbine required for a given power output and to increase the rotational speed of the turbine. This type of augmenting diffusor shroud has proven to be uneconomical, since the ratio of the diffusor shroud's total length to its throat diameter is of the order of 7 to 1 to 3 to 1, with the main contribution to the shroud length being the diffusor proper. Such large sized stationary shrouds are not only expensive as regards their construction, but also require expensive structures for their support.

From British Patent Specification No. 1,386,335, there is known a turbine rotor of the type indicated in the introduction, serving to produce a cylindrical downflow for aircraft lift and propulsion. This known rotor comprises an annular shroud surrounding the outer ends of the rotor blades as well as an annular shroud affixed to the inner ends of the rotor blades. Both annular shrouds are co-rotating with the rotor blades and define an annular flow passage having the rotor blades disposed therein. In radial section the two annular shrouds define a diffusor-like passage extending from its upstream intake end inwardly to a bend at the inside of the passage, and from there diverging towards the downstream end to form an outlet opening having a larger diameter. Thus the inner annular shroud and the outer annular shroud together form a diffusor having its narrowest part downstream of the forward end of the annular flow passage. With the use of a rotor of this construction for a wind turbine, it is possible to obtain a 50% increase of the energy output, based on the rotor disk area.

It is an object of the invention to provide a rotor of the type indicated in the introduction, ensuring an improved energy conversion as compared to known rotors of equal diameter, while being of simple design, economical construction, having lower space requirement and being economical and reliable in operation.

In order to attain this object, the outer annular shroud according to the invention is formed such that the passage surrounded thereby widens from its upstream intake opening towards its downstream outlet opening, with the annular shroud in radial section having a profile adapted to produce a lift force under onflow conditions and being oriented such that its suction side forms the interior surface of the annular shroud facing said passage and that its angle of attack relative to a direction extending parallel to the central axis of the annular passage is smaller than the critical (stalling) angle of said profile.

The configuration of the rotor according to the invention offers substantial advantages over prior art. Since the intake edge of the annular shroud has a smaller diameter than its outlet edge, and since the angle of attack of the annular shroud's profile does not exceed the critical stalling angle thereof, the profile of the annular shroud under onflow of the wind stream acts as an airfoil producing a lift. In this case this lift acts radially inwards, tending to contract the outer annular shroud concentrically about the center axis thereof. This aerodynamic force acting on the annular shroud is combined with a circulation about the annular shroud. (This type of circulation is also present in the conventional airfoil flow pattern.)

Since the annular shroud is axially symmetrical, there forms a vortex toroid lying in the main rotor plane and remaining restricted to an area in the intermediate vicinity of the rotor plane. This means that a net circulation is established in such a sense that an augmentation of the flow volume is established without a physical diffusor being present adjacent the rotor. Due to the presence alone of the vortex toroid, the onflowing air attains an increased velocity in the rotor passage, whereby the volumetric flow rate as well as the downstream flow cross section are increased correspondingly. This results in an increase of the power output of the turbine. Thus the configuration and the profile design of the annular shroud of the rotor according to the invention combine to result in a control of flow conditions about the rotor, so as to produce by aerodynamic means an effect corresponding to that of a physical diffusor means disposed about the rotor, which would require a considerable axial length, and thus a large space. Due to the absence of a bulky diffusor means of considerable length particularly in the axial direction, the rotor according to the invention can be designed very compactly and to save space, while nevertheless permitting to achieve a considerable increase of the converted energy, based on the rotor flowthrough area, as compared to known rotors. The rotor according to the invention may be of a very lightweight and therefore low cost construction, since the outwardly directed centrifugal forces acting on the annular shroud on rotation of the rotor are to a large extent compensated by the radially inwardly directed "lift" produced under onflow conditions by the profile of the outer annular shroud. In view of the small forces to be absorbed by the structure, it is therefore also possible to prefabricate the annular shroud in individual sections having a suitable size for transport, and to assemble these sections at the installation site of the turbine. This is of particular importance in the construction of wind turbines having a large diameter. Seen as a whole, the rotor according to the invention is simple and space-saving construction and has a very high degree of efficiency as well as of economy and reliability in operation.

In an advantageous embodiment of the invention, the rotor is provided with a further inner annular shroud affixed to the inner ends of the rotor blades and defining an inner limit of the passage surrounded by the outer annular shroud, said inner annular shroud in radial section having a profile adapted to produce a lift force under onflow conditions and being oriented such that its suction side forms the exterior surface of the inner annular shroud facing said passage, and that its angle of attack relative to a direction extending parallel to the center axis of the annular passage is smaller than the critical (stalling) angle of said profile. In this embodiment of the rotor, the flow passage, through which the stream to be converted by the turbine flows, is defined not only by an outer annular shroud, but also by an inner annular shroud, which due to the configuration of its cross section as a slanting profile acts in an analogous manner as already described in detail with respect to the effect of the outer annular shroud. In this manner, the inner wall of the annular passage as well as the outer wall thereof are employed for generating a circulation, itself acting in the manner of a physical diffusor, so that the sectional area of the oncoming flow embraced and conducted into the rotor is considerably larger than the flow area determined by the cross section of the rotor's annular passage. Thus this embodiment also results in a greatly increased utilization of the onflowing medium's energy as compared to conventional rotors, and a far more space-saving construction than in the case of rotors surrounded by elongate diffusors. In this embodiment of a rotor according to the invention, the axially interior space inside of the rotor blades is not occupied by a fairing projecting upstream of the rotor plane, but forms an obstructed opening, through which only the struts supporting the rotor on its shaft extend, so as to permit flow-through of such opening and thus the establishment of a circulation about the profile of the inner annular shroud.

A particularly advantageous embodiment of the rotor according to the invention is further obtained by the profile of the respective annular shroud being designed as a curved aerodynamically shaped profile having an upstream entry nose and a downstream edge. By selecting the profile, for instance among the numerous wing profiles described in the literature (such as NACA profiles, CLARK, or LIEBEC profiles), it is possible to coordinate the drag values, lift values and values of the critical angle of attack such that the optimum effect of the annular shroud is achieved under any desired conditions.

In a particularly advantageous embodiment the invention provides that the upstream edges of the rotor blades extend in a common plane with the upstream edge, or edges, of the annular shroud, or shrouds, respectively. This arrangement results in the rotor blades being disposed at that portion of the annular shroud, or shrouds, respectively, at which the flow through the annular passage, in which the rotor blades are disposed, has its highest velocity under the influence of the circulation about the annular shroud. In this manner it is possible to achieve an optimum efficiency with a rotor of smallest dimensions.

Advantageously the rotor according to the invention is designed such that the axial length of each annular shroud is a fraction of the outer diameter of the rotor. In the rotor according to the invention, the axial length of the annular shrouds can be very short, since the profiled configuration thereof results in the establishment of a circulation, and thus in an aerodynamic diffusor effect, without necessitating the employ of a physical diffusor extending over a considerable length downstream of the turbine. The invention thus provides a very compact rotor the axial length of which is substantially restricted to that of the rotor blades.

Embodiments of the rotor according to the invention shall now be described with reference to the accompanying drawings in which.

Figure 1:
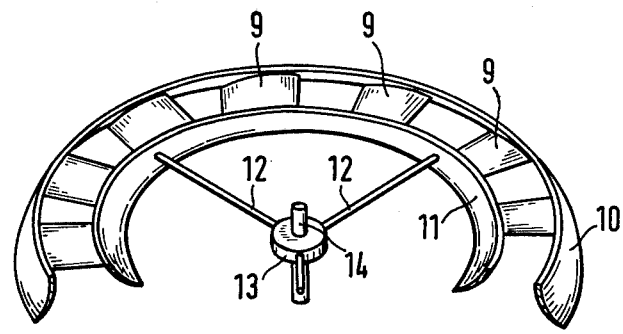
FIG. 1 shows a perspective view of one half of a rotor according to the invention.
Figure 2:
FIG. 2 shows a radial section of the rotor of FIG. 1.
Figure 2:
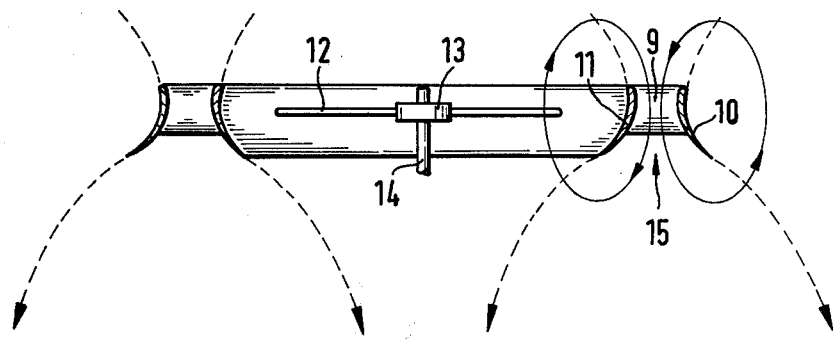
Figure 3A:
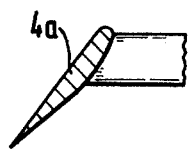
Figure 3B:
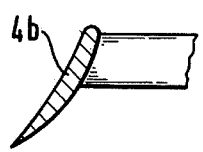
Figure 3C:
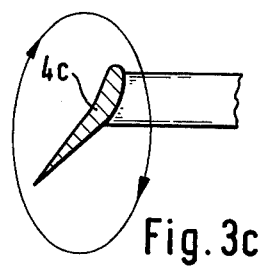
Figure 3D:
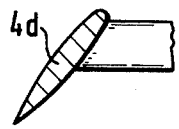
Figure 3E:
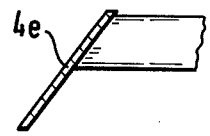

FIGS. 3a–e show five exemplary embodiments a to e of profile sections of the annular shroud of the rotor according to FIGS. 1 and 2.

FIGS. 1 and 2 show an exemplary embodiment of the rotor. The rotor shown in these figures has a plurality of rotor blades 9 uniformly spaced about its circumference and having affixed to their outer ends an outer annular shroud 10, and to their inner ends, an inner annular shroud 11. The inner annular shroud 11 is connected through spokes 12 to a central hub 13 non-relatively rototably supported by a shaft 14. The shaft may be rotatably supported in a carrier structure and coupled to a current generator, the last-named parts not being shown in the drawings for the sake of simplicity.

The outer annular shroud 10 is formed such that the passage 15 surrounded thereby, through which the air impinging on the rotor blades flows, widens from its upstream intake opening to its downstream outlet opening. Annular shroud 10 in radial section has a profile adapted to produce a lift force under onflow conditions and oriented in the annular shroud 10 such that its suction side forms the interior surface of the annular shroud 10 facing towards passage 15, and that the angle of attack of the profile relative to a direction extending parallel to the center axis of annular passage 15 is smaller than the critical angle of attack of the profile, at which separation of the flow from the profile would occur.

As shown particularly in FIG. 2, the upstream edges of the rotor blades 9 lie in a common plane with the forward edge of annular shroud 10.

The axial length of the annular shroud 10 amounts to only a fraction of the rotor's outer diameter.

As particularly shown in FIG. 2, the profile of annular shroud 10 is disposed at an angle to the oncoming wind flow along the entire circumference of the shroud. This results in an aerodyanmic (lift) force acting substantially radially inwards of the annular shroud, as generally known from the airfoil theory. In combination therewith, there develops a circulation about the profile of the annular shroud along its entire circumference, as shown in FIG. 2, by an elliptical line surrounding each of the section points of the annular shroud. This circulation results in an increase of the flow velocity in passage 15 over the flow velocity of the wind stream in front of the rotor, whereby the cross sectional flow area of the oncoming wind embraced by the rotor is greater than the flow area of passage 15. The flow pattern of the oncoming air stream in the area embraced by the configuration and arrangement of the annular shroud 10 as well as the flow pattern thereof after passing through the rotor are substantially shown by phantom lines in FIG. 2. The arrangement and the profiled shape of the annular shroud 10 result in an aerodynamic effect on the rotor, due to which the oncoming air stream is embraced, directed through passage 15 of the rotor, and exhausted backwards under enlargement of its cross section, in an area substantially larger than that of the rotor surface area. The arrangement of the annular shroud with its profiled shape thus results in an aerodynamic flow augmentation effect otherwise obtainable only with the aid of stationary diffusor structures disposed about a revolving rotor and having a diffusor proper extending backwards far beyond the rotor. An elongate physical diffusor of this kind is not required for the rotor accordig to FIGS. 1 and 2. Due to the flow augmentation effect of the rotor according to FIGS. 1 and 2, the efficiency thereof is considerably improved over that of a conventional rotor of the same diameter. The inner annular shroud 11 also has, in radial section, a profile adapted to produce a lift force under onflow conditions, and oriented in the inner annular shroud such that its suction side forms the outer surface thereof facing the passage 15. Passage 15 is outwardly defined by the outer annular shroud 10, and inwardly, by inner annular shroud 11, thus forming an annular passage in which the rotor blades 9 are disposed and through which passes the flow impinging on rotor blades 9. The angle of attack of the profile of the inner annular shroud 11 relative to a direction extending parallel to the center axis of annular channel 15 is smaller than the critical angle of attack of the profile, at which separation of the flow would occur. The profile may be one of the conventional airfoil profiles 4a, 4b, 4c, 4d, or 4e shown in FIGS. 3a to 3e.

In the case of the rotor shown in FIGS. 1 and 2, the central area inwardly of the inner ends of rotor blades 9 is formed as an open section through which the air stream may pass freely. The spokes 12 connecting the rotor to its hub 13 and disposed in this open section constitute a negligible restriction of the open section. Due to the fact that the central area of the rotor in the embodiment of FIGS. 1 and 2 is pervious to flow, a circulation may also be formed about the profile of the inner annular shroud under onflow conditions, as shown in phantom lines in FIG. 2. This circulation is to be considered, of course, to extend along the entire circumference of the annular shroud. Thus the circulations about the inner annular shroud 11 and the outer annular shroud 10 each form a respective vortex toroid. Due to this circulation, the oncoming flow attains an increased velocity adjacent passage 15 of the rotor, and in addition, a greater amount of air is introduced into said passage than the amount of air corresponding to the sectional area of said passage in the case of a non-shrouded rotor of the same diameter. Thus in this embodiment there is likewise established an aerodynamic diffusor effect without there having to be provided an elongate, stationary diffusor surrounding the rotor. In this embodiment, the rotor may thus also be designed in a very short and compact form, and its efficiency is far greater than that of conventional rotors of the same diameter.

FIG. 3 shows five exemplary embodiments of the profile of the annular shroud 10. These profiles are examples of a great number of airfoil or wing profiles already tested and analyzed by research establishments. The relevant data of these profiles, e.g. drag, lift, critical angle of attack etc. are recorded in textbooks and therefore readily accessible for designing the annular shroud. FIG. 3a to 3d show curved profiles having a rounded entry nose and a sharp downstream edge (FIG. 3a CLARK profile, FIG. 3b curved profile, FIG. 3c LIEBECK profile, FIG. 3d NACA profile). The employ of profiles of this type in the annular shroud 10 results in particularly favorable flow patterns. In principle, however, it is also possible to employ a simple plate for the profile, as shown in FIG. 3e. While the aerodynamic properties of a plate profile of this kind are less favorable than those of specifically shaped aerodynamic profiles, the flow augmentation effect achieved with an annular shroud of this configuration in the rotor according to FIGS. 1 and 2 is still quite considerable.

The invention is not restricted to the exemplary embodiments described above. It is thus also possible to provide two coaxial, coplanar, counter-rotating rotors, with the outer rotor of the two carrying at its periphery an outer annular shroud while the inner rotor may be provided at its inner periphery with an inner annular shroud of the types described above with reference to FIGS. 1 and 2. This arrangement would permit attaining the air flow augmentation effect of the rotor according to the invention also in the case of coaxial, coplanar, counter-rotating rotors.

Any characteristics revealed by this specification and the accompanying drawings, including any structural details, may be essential to the invention individually as well as in any combination.

What is claimed is:

1. A turbine rotor for operation without the influence of flow-guiding stationary housings or channels in a flow medium contained in a space of unlimited dimensions as compared to the dimensions of the rotor, comprising a shroud attached to the rotor blades adjacent the outer periphery of said rotor and formed as an axialy symmetrical outer annular shroud rotating in unison with the rotor and an inner annular shroud attached to the rotor blades in radial distance within the outer annular shroud, both annular shrouds in radial section having profiles adapted to produce a lift force under onflow conditions, said inner annular shroud being attached to the inner ends of the rotor blades and together with the outer annular shroud delimits an annular passage, the profiles being oriented in the inner and outer annular shrouds respectively such that their suction sides are facing the passage and that the effective angles of attack of said profiles with respect to a direction parallel to the central axis of said passage are smaller than the respective critical (stalling) angles of said profiles.

2. Rotor according to claim 1, wherein the profile of each annular shroud is designed as a curved aeordynamically shaped profile having an upstream entry nose and a downstream edge.

3. Rotor according to claim 1, wherein upstream edges of the rotor blades and upstream edges of said annular shrouds are in a common plane.

4. Rotor according to claim 1, wherein the axial length of said annular shroud is a fraction of the outer diameter of the rotor.

5. Rotor according to claim 3 wherein the axial length of said annular shroud is a fraction of the outer diameter of the rotor.

6. Rotor according to claim 2, wherein upstream edges of the rotor blades and upstream edges of said annular shrouds are in a common plane.

7. Rotor according to claim 2, wherein the axial length of said annular shroud is a fraction of the outer diameter of the rotor.

* * * * *